United States Patent

Kan

[11] Patent Number: 5,907,452
[45] Date of Patent: May 25, 1999

[54] APPARATUS AND METHOD TO DAMPEN FLEX CABLE VIBRATION TO DISK DRIVE ACTUATOR

[75] Inventor: Terrence Kan, San Jose, Calif.

[73] Assignee: International Business Machines Corporation, Armonk, N.Y.

[21] Appl. No.: 08/954,569

[22] Filed: Oct. 20, 1997

[51] Int. Cl.[6] .......................... G11B 21/12; G11B 33/08
[52] U.S. Cl. .......................................................... 360/97.01
[58] Field of Search .............................. 360/97.01, 97.02, 360/104–106

[56] References Cited

U.S. PATENT DOCUMENTS

| | | | |
|---|---|---|---|
| 5,095,396 | 3/1992 | Putnam et al. | 360/106 |
| 5,130,895 | 7/1992 | Somemiya et al. | 361/398 |
| 5,161,074 | 11/1992 | Forbord et al. | 360/97.01 |
| 5,267,376 | 12/1993 | Jabbari et al. | 24/457 |
| 5,375,021 | 12/1994 | Boeckner | 360/97.01 |
| 5,400,195 | 3/1995 | Morii et al. | 360/97.01 |
| 5,495,377 | 2/1996 | Kim | 360/106 |
| 5,526,208 | 6/1996 | Hatch et al. | 360/109 |
| 5,615,068 | 3/1997 | Matsuda et al. | 360/106 |
| 5,631,788 | 5/1997 | Richards | 360/104 |
| 5,655,285 | 8/1997 | Bonn et al. | 29/603.03 |
| 5,682,281 | 10/1997 | Kojima et al. | 360/97.01 X |
| 5,801,899 | 9/1998 | Genheimer | 360/97.01 |

FOREIGN PATENT DOCUMENTS

| | | | |
|---|---|---|---|
| 60-18869 | 1/1985 | Japan | G11B 21/08 |
| 2-141980 | 5/1990 | Japan | G11B 21/12 |
| 3-214414 | 9/1991 | Japan | G11B 5/60 |
| 4-319592 | 11/1992 | Japan | G11B 33/12 |
| 6-76498 | 3/1994 | Japan | G11B 21/02 |

*Primary Examiner*—John H. Wolff
*Attorney, Agent, or Firm*—Noreen A. Krall; Randall J. Bluestone

[57] ABSTRACT

A method and apparatus for damping actuator flex cable vibrations in a disk drive during actuator seek operations to improve disk drive performance. The actuator flex cable loop includes a damping element inserted in the J-block area of the actuator arm. The damping element can be foam, rubber, encapsulated visco-elastic material, spring clip supports or extensions of the cable support brackets. The damping element damps the vibrations of the dynamic loop of the actuator flex cable between the actuator assembly and the arm electronic bracket fixed to the disk drive housing. Decreasing the amplitude of vibrations coupled to the actuator assembly results in improved arrival performance of the disk drive during seek operations.

23 Claims, 8 Drawing Sheets

APPARATUS AND METHOD TO DAMPEN FLEX CABLE VIBRATION TO DISK DRIVE ACTUATOR

BACKGROUND OF THE INVENTION

1. Field of the Invention

This invention relates in general to disk drives, and in particular to an apparatus and method to dampen flex cable vibration to the actuator in a disk drive to minimize the effects of vibrations on disk drive performance.

2. Description of Related Art

Moving magnetic storage devices, especially magnetic disk drives, are the memory devices of choice. This is due to their expanded non-volatile memory storage capability combined with a relatively low cost.

Magnetic disk drives are information storage devices which utilize at least one rotatable magnetic media disk having concentric data tracks defined for storing data, a magnetic recording head or transducer for reading data from and/or writing data to the various data tracks, a slider for supporting the transducer in proximity to the data tracks typically in a flying mode above the storage media, a suspension assembly for resiliently supporting the slider and the transducer over the data tracks, and a positioning actuator coupled to the transducer/slider/suspension combination for moving the transducer across the media to the desired data track and maintaining the transducer over the data track center line during a read or a write operation. The transducer is attached to or is formed integrally with the slider which supports the transducer above the data surface of the storage disk by a cushion of air, referred to as an air-bearing, generated by the rotating disk.

Alternatively, the transducer may operate in contact with the surface of the disk. Thus, the suspension provides desired slider loading and dimensional stability between the slider and an actuator arm which couples the transducer/slider/suspension assembly to the actuator. The actuator positions the transducer over the correct track according to the data desired on a read operation or to the correct track for placement of the data during a write operation. The actuator is controlled to position the transducer over the desired data track by shifting the combination assembly across the surface of the disk in a direction generally transverse to the data tracks. The actuator may include a single arm extending from a pivot point, or alternatively a plurality of arms arranged in a comb-like fashion extending from a pivot point. A rotary voice coil motor (vcm) is attached to the rear portion of the actuator arm or arms to power movement of the actuator over the disks. The term seek refers generally to the radial movement of the heads or transducer to a specified track on the disk.

The vcm located at the rear portion of the actuator arm is comprised of a top plate spaced above a bottom plate with a magnet or pair of magnets therebetween. The vcm further includes an electrically conductive coil disposed within the rearward extension of the actuator arm and between the top and bottom plates, while overlying the magnet in a plane parallel to the magnet. In operation, current passes through the coil and interacts with the magnetic field of the magnet so as to rotate the actuator arm around its pivot and thus positioning the transducer as desired.

The magnetic media disk or disks in the disk drive are mounted to a spindle. The spindle is attached to a spindle motor which rotates the spindle and the disks to provide read/write access to the various portions on the concentric tracks on the disks.

One or more electrical conductors extend over the suspension assembly to electrically connect the read/write transducer to a read/write chip on the actuator arm. A multiline flexible printed circuit cable (actuator flex cable) provides the electrical contact between the read/write chip and the disk drive electronics which are mounted outside the disk drive housing. Inside the disk drive housing, the actuator flex cable connects to an electrical connector pin assembly, which in turn, through an opening or connector port in the housing, connects to the external electronics.

The actuator flex cable is a flexible circuit that carries electrical signals to and from the actuator. It is typically comprised of a plurality of electrical conductors encapsulated within an insulating material, for example polyimide. The actuator flex cable provides electrical contact from the external electronics fixed to the disk drive housing to the actuator which is supported on bearings allowing radial motion of the actuator about its pivot point. The radial motion of the actuator allows the read/write transducers supported on suspensions fixed to the actuator to access data tracks on the disk surfaces located at any radial position from the disk ID to the disk OD. The preferred method of fixing the actuator flex cable between electronics card on the fixed disk drive housing and the rotatable actuator is to form the actuator flex cable in a loop so that the actuator flex cable causes minimal constraint on the actuator rotation. The loop of actuator flex cable connecting the actuator with the electronics card can vibrate during seeking of the actuator, introducing unwanted vibration modes to the actuator. Vibration (often referred to as random transient vibration) of the actuator during seek operations degrades settling performance of the disk drive.

There have been attempts in the prior art to minimize the affects of the flex cable on the actuator or head carriage assembly. For example, U.S. Pat. No. 5,400,195 issued to Morii et al. describes the placement of a double sided pressure sensitive adhesive tape between the flex cable and the actuator arm to mitigate deformation of the head carriage. JP 4-319592 describes the placement of a reducing member supporting mechanism and a reducing member sandwiched together at the base plate where the flex cable attaches to the disk drive housing. It can clearly be seen however that none of these approaches address the problem where the actuator is moved between the inner and the outer diameter of the disk and the flex cable loop moves between its most extended and its most compressed position. It therefore can be seen that there is a need for a method and an apparatus for reducing or eliminating vibration of the actuator flex cable during seek operations so as to minimize performance degradation of the disk drive.

SUMMARY OF THE INVENTION

To overcome the shortcomings of the prior art described above, it is the object of the present invention to disclose an apparatus and method of damping actuator flex cable vibrations in a disk drive during actuator seek operations to improve disk drive performance.

It is also the object of the present invention to disclose a magnetic disk drive having a damper positioned at one or both of the actuator flex cable attachment points to damp vibrations of the actuator flex cable during seek operations.

Briefly stated, the preferred embodiment of the present invention is an actuator flex cable loop having a damping means inserted in the J-block area of the actuator arm. The damping means may be foam, rubber, encapsulated viscoelastic material, spring clip supports or extensions of the cable support brackets. The damping means is inserted into the j-block bend to damp the modes of vibration on the flex cable. This damping means will engage the length of the flex cable at the j-block, thereby removing the contribution of the flex cable dynamics on the random transient vibration of the actuator assembly.

Alternatively, the damping means could be inserted at the arm electronics bracket to damp the vibrations of the loop of the actuator flex cable between the actuator assembly and the arm electronic bracket fixed to the disk drive housing. In either case, decreasing the amplitude of vibrations coupled to the actuator assembly results in improved arrival performance of the disk drive during seek operations.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION OF THE PREFERRED EMBODIMENT

This invention is described in a preferred embodiment in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
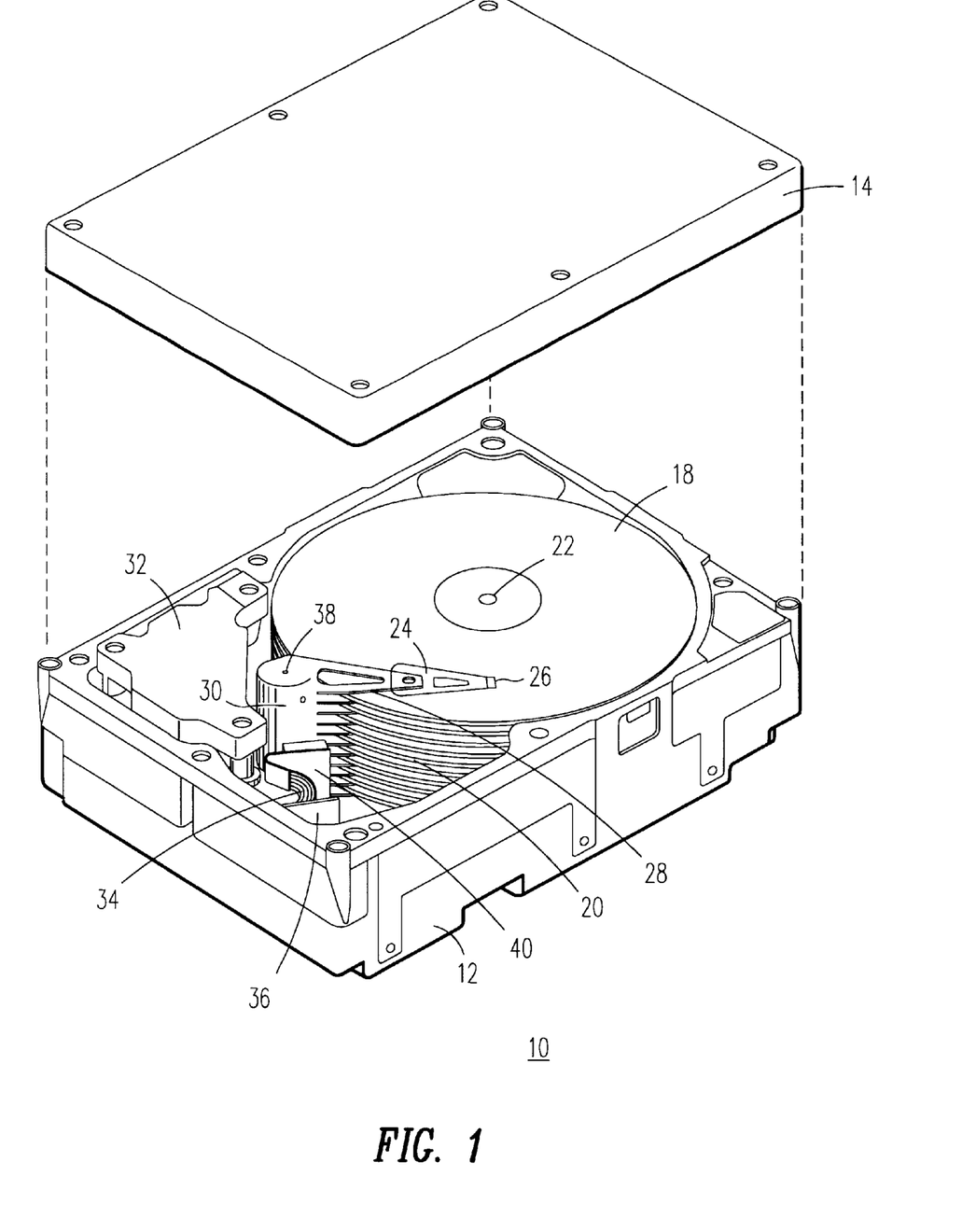
FIG. 1 is a perspective view of the disk drive of the present invention illustrating the relative placement of the components.

FIG. 1 shows a disk drive system designated by the general reference number 10. The lid 14 of the disk drive is shown exploded. In operation, the lid would be disposed on top of the housing 12.

The disk drive comprises one or more magnetic disks 18. The disks 18 may be conventional particulate or thin film recording disks, which are capable of storing digital data in concentric tracks. In a preferred embodiment, both sides of the disks 18 are available for storage, and it will be recognized by one of ordinary skill in the art that the disk drive 10 may include any number of such disks 18.

The disks 18 are mounted to a spindle 22. The spindle 22 is attached to a spindle motor (not shown) which rotates the spindle 22 and the disks 18 to provide read/write access to the various portions of the concentric tracks on the disks 18.

An actuator assembly 30 includes a positioner arm 28, and a suspension assembly 24. The suspension assembly 24 includes a slider/transducer assembly 26 at its distal end. Although only one slider/transducer assembly 26 of the suspension assembly 24 is shown, it will be recognized that the disk drive 10 has one slider/transducer assembly 26 for each side of each disk 18 included in the drive 10. The positioner arm 28 further comprises a pivot 38 around which the positioner arm 28 pivots.

The disk drive 10 further includes an amplifier chip 40. As is well known in the art, the amplifier chip 40 cooperates with the slider/transducer assembly 26 to read data from or write data to the disks 18. A flexible printed circuit member or actuator flex cable 34 carries signals between the amplifier chip 40 and a connector pin assembly (not shown) attached to the disk drive housing 12 which interfaces with the external signal processing electronics. The actuator flex cable 34 leading from the amplifier chip 40 is attached to an arm electronics (AE) bracket 36 which directs the actuator flex cable 34 to a connector port for connection to the connector pin assembly.

The main function of the actuator assembly 30 is to move the positioner or actuator arm 28 around the pivot 38. Part of the actuator assembly 30 is the voice coil motor (vcm) assembly 32 which comprises a vcm bottom plate, a magnet and a vcm top plate in combination with an actuator coil. Current passing through the actuator coil interacts with the magnetic field of the magnet to rotate the positioner arm 28 and suspension assembly 24 around the pivot 38, thus positioning the slider/transducer assembly 26 as desired.

Figure 2:
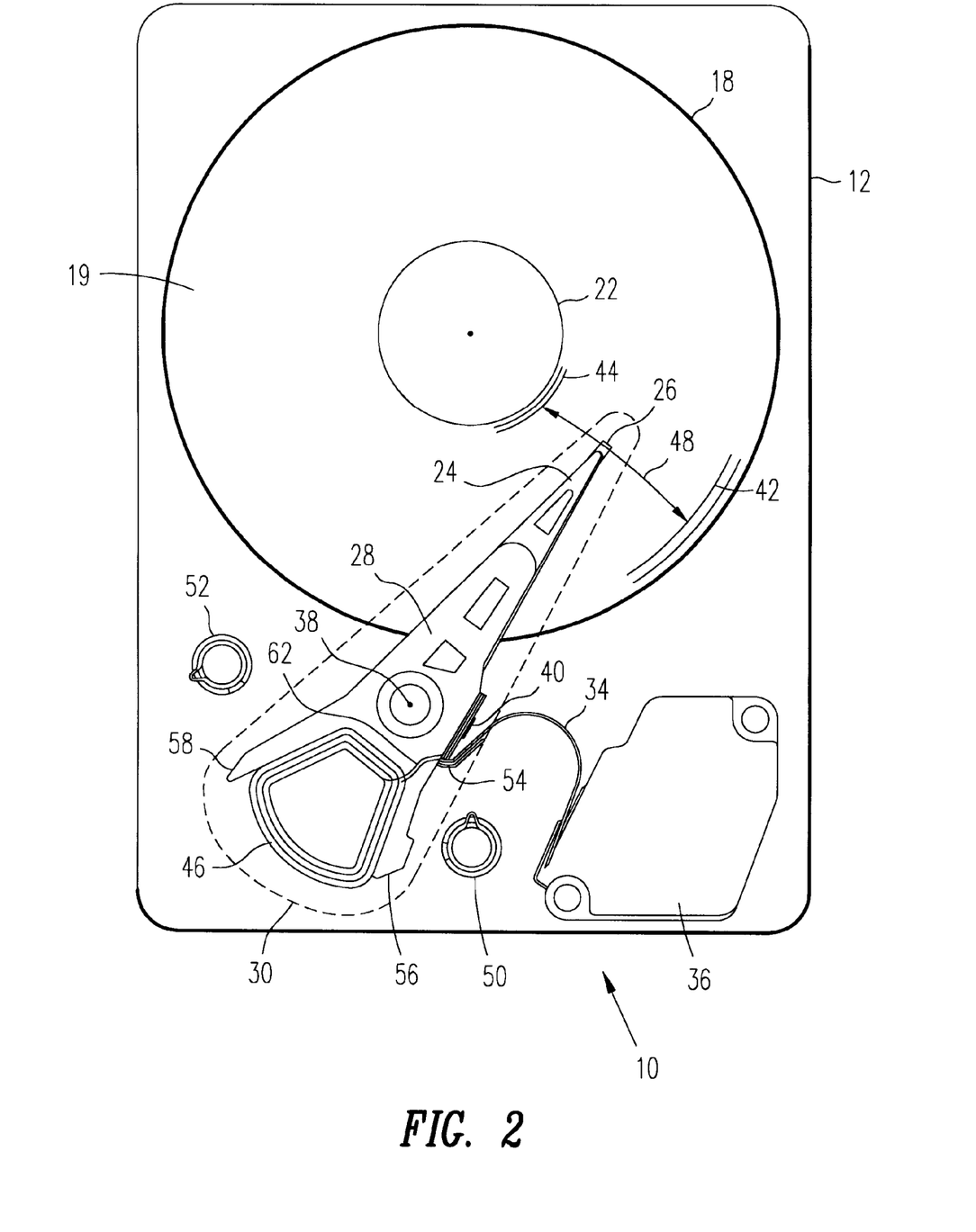
FIG. 2 is a plan view of the actuator and flex cable in the disk drive.

Referring now to FIG. 2, a plan view of the disk drive 10 shows the placement of the actuator assembly 30 relative to the disk 18. The actuator assembly 30 rotates about pivot point 38 to allow the slider/transducer assembly 26 to access data stored on concentric data tracks on the disk 18. Motion of the slider/transducer assembly 26 over the disk surface 19 is shown by arrow 48. Actuator assembly 30 rotation about pivot point 38 is limited by limit stops 50, 52 coming in contact with rearward extensions or vcm coil support arms 56, 58 of the actuator assembly 30. The limits of actuator assembly rotation define the inner diameter (ID) track 44 and the outer diameter (OD) track 42 on disk surface 19 that may be accessed by the slider/transducer assembly 26. A vcm coil 46 is fixed to the vcm coil support arms 56,58. Conductive coil leads 62 provide electrical connection of the vcm coil 46 to the actuator flex cable 34 near to the amplifier chip 40.

The actuator flex cable 34 is fixed to the actuator assembly 30 at a J-shaped fixture (J-block) 54 which provides support for the actuator flex cable 34 and directs the cable to form a self supported arc or loop between the actuator assembly 30 and the AE bracket 36. The loop formed by the actuator flex cable 34 provides mechanical isolation for the actuator assembly 30 allowing rotary motion of the actuator assembly 30 during accessing operations with minimal mechanical constraint.

Disk drive performance as measured by track-misregistration (TMR) is degraded by vibration of components within the disk drive. Random transient vibration (RTV) can further degrade disk drive performance during accessing of the actuator assembly 30. In particular, the actuator flex cable 34 can introduce modes of vibration during seeking of the actuator assembly 30. The loop of the actuator flex cable 34 formed between attachment points at the J-block 54 on the actuator assembly 30 at one end and the AE bracket at the other end of the actuator flex cable 34 has vibration modes which can be excited during actuator assembly 30 seeking. Experiments by the inventor on a 3.5 inch disk diameter form factor disk drive have identified RTV modes in the frequency range from 200 Hz to 400 Hz to be due to vibrations of the loop in the actuator flex cable 34 excited by actuator assembly 30 seeking. These experiments found that the actuator flex cable 34 vibration mode increased in frequency as seek operations were shifted from the disk OD 42 to the disk ID 44. Further experiments showed that the unwanted vibration modes of the actuator flex cable 34 can be attenuated by placement of damping material in contact with the end regions of the actuator flex cable loop.

Figure 3:
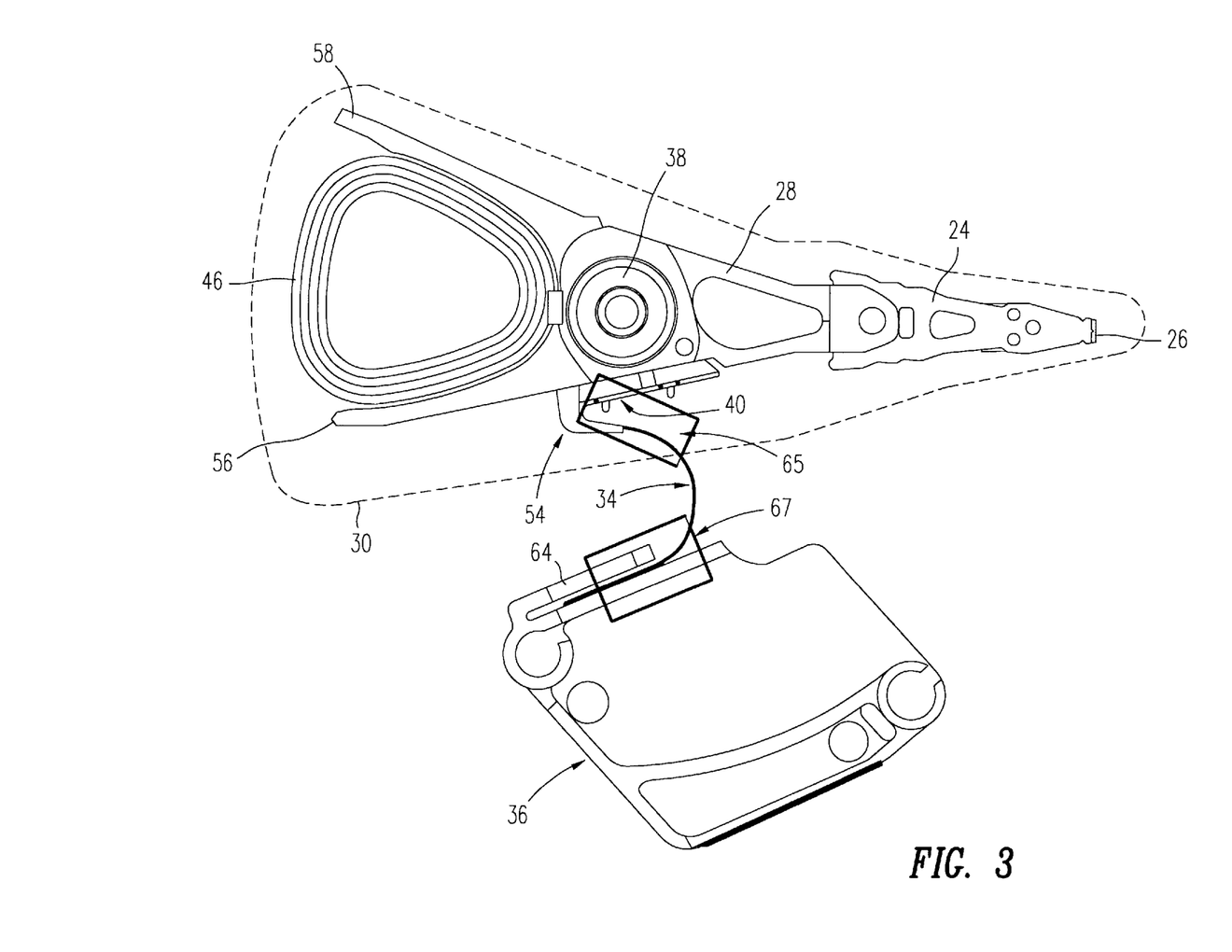
FIG. 3 is a plan view of the actuator assembly and connector bracket showing location areas for actuator flex cable damping.

Referring now to FIG. 3, the actuator assembly 30 and AE bracket 36 are shown connected with the loop of the actuator flex cable 34. The loop of the actuator flex cable 34 has one end fixed at the J-block 54 on the actuator assembly 30 and the other end fixed at the clip 64 on the AE bracket 36. Insertion of damping means at either the J-block 54 end (indicated by boxed area 65) of the actuator flex cable 34 or at the clip 64 end (indicated by boxed area 67) of the actuator flex cable 34 or both ends can attenuate the actuator flex cable vibration modes according to the present invention.

Figure 4A:
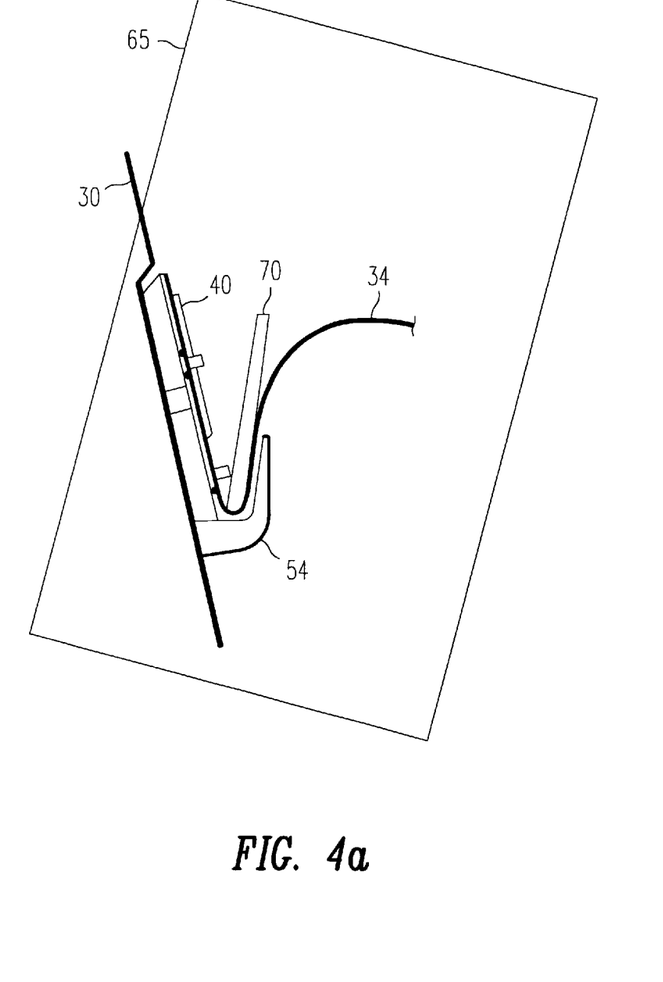
FIG. 4a is a top view of the J-block with the actuator flex cable and a damping means of suitable damping material inserted therein.
Figure 4B:
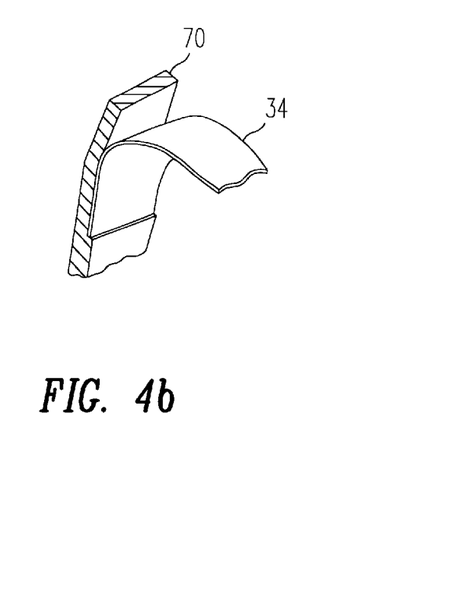
FIG. 4b is a perspective view of the damping means in contact with the actuator flex cable at the J-block area.

Referring now to FIGS. 4a and 4b, a preferred embodiment of the damping method and apparatus of the present invention is shown. FIG. 4a is an enlargement of boxed area 65 from FIG. 3, and shows the J-block 54 fixed to the actuator assembly 30. Actuator flex cable 34 is attached to J-block 54 and guided by the J-block 54 to form the loop which extends to the AE bracket (not shown). Damping means 70 is inserted in the J-block area on the side of the actuator flex cable 34 that folds to face the actuator assembly 30. The damping means 70 is fixed in position so as to engage the length of the actuator flex cable 34 at the J-block 54. In the preferred embodiment, damping means 70 is formed of a suitable damping material such as damping foam, encapsulated viscoelastic material, elastomers or may be a constrained layer damper. FIG. 4b shows an enlargement of the damper 70 attached to the actuator flex cable. In one embodiment, the foam pad is of sufficient thickness so that when inserted into the bend of the J-block, frictional forces alone are adequate to maintain its position during actuator accessing. Further assurance of positioning is possible with adhesives, or addition molded features of the J-block.

Figure 5A:
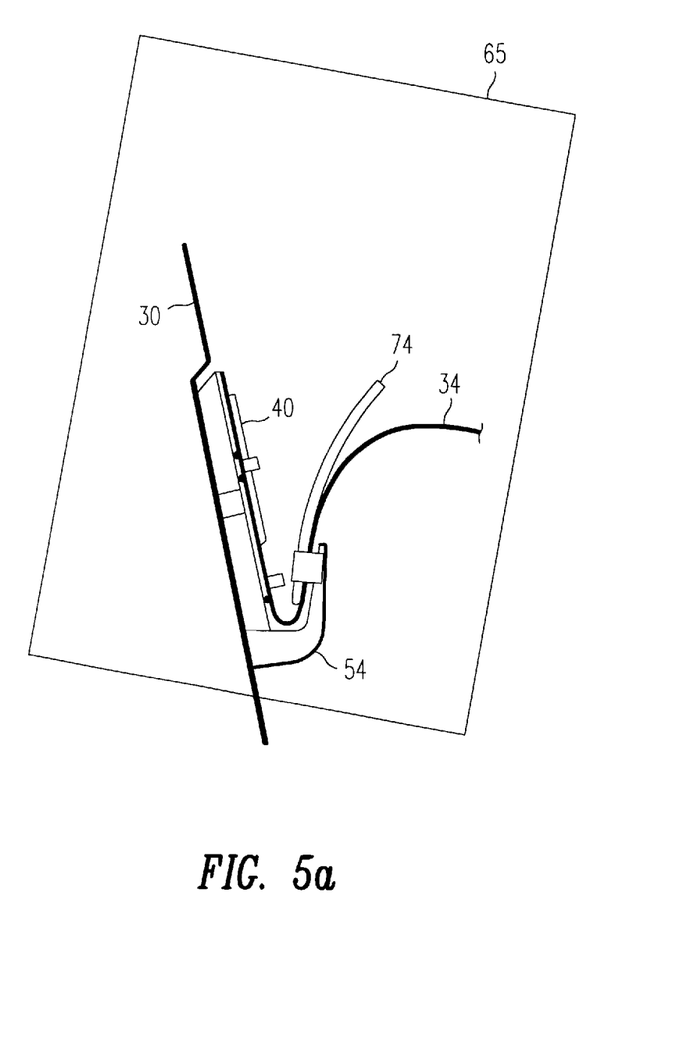
FIG. 5a is a top view of the J-block with the actuator flex cable and the spring clip damper of the invention.
Figure 5B:
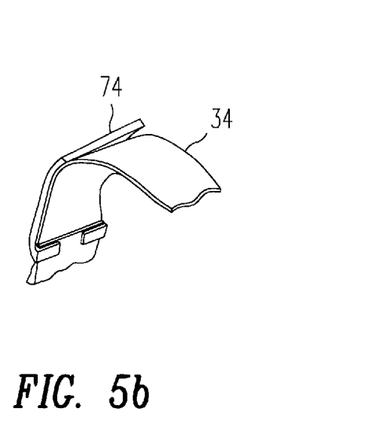
FIG. 5b is a perspective view of the spring clip in contact with the actuator flex cable at the J-block area.
Figure 6A:
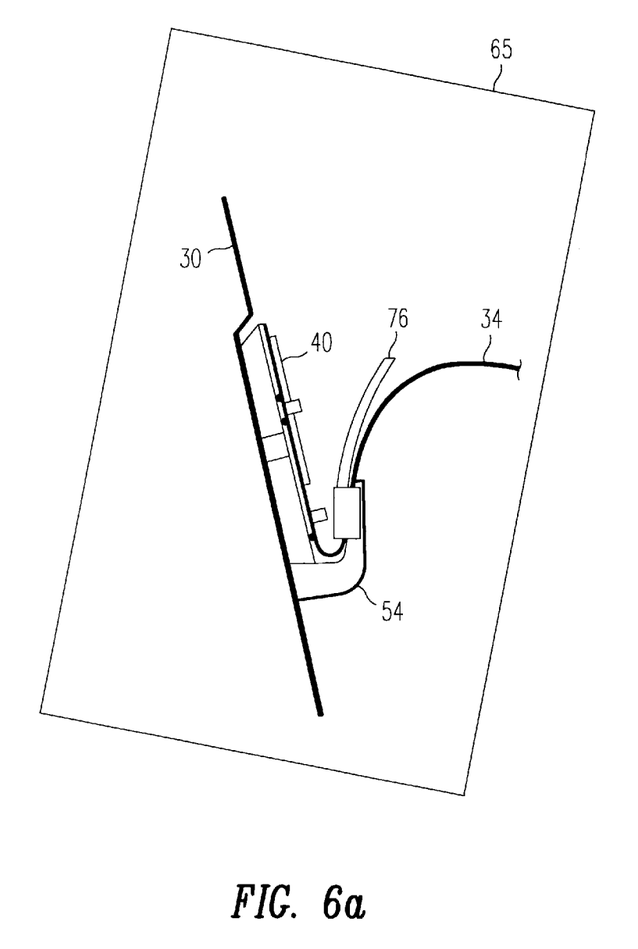
FIG. 6a is a top view of the J-block with the actuator flex cable and the cable support extension damper of the invention.
Figure 6B:
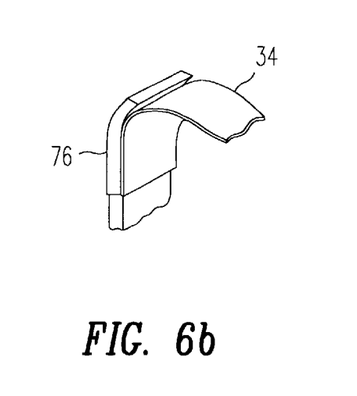
FIG. 6b is a perspective view of the extension to the cable support in contact with the actuator flex cable at the J-block area.

Alternate embodiments of the invention are shown in FIGS. 5a, 5b and 6a, 6b. FIGS. 5a and 5b show a spring clip 74 clipped to the actuator flex cable 34 in the J-block area so as to engage the length of the actuator flex cable 34 at the J-block 54 on the side of said actuator flex cable 34 that folds to face the actuator assembly 30. FIGS. 6a and 6b show an extension of the J-block 54 providing support of the actuator flex cable 34 in the J-block area on the side of the actuator flex cable 34 that folds to face the actuator assembly 30.

Figure 7:
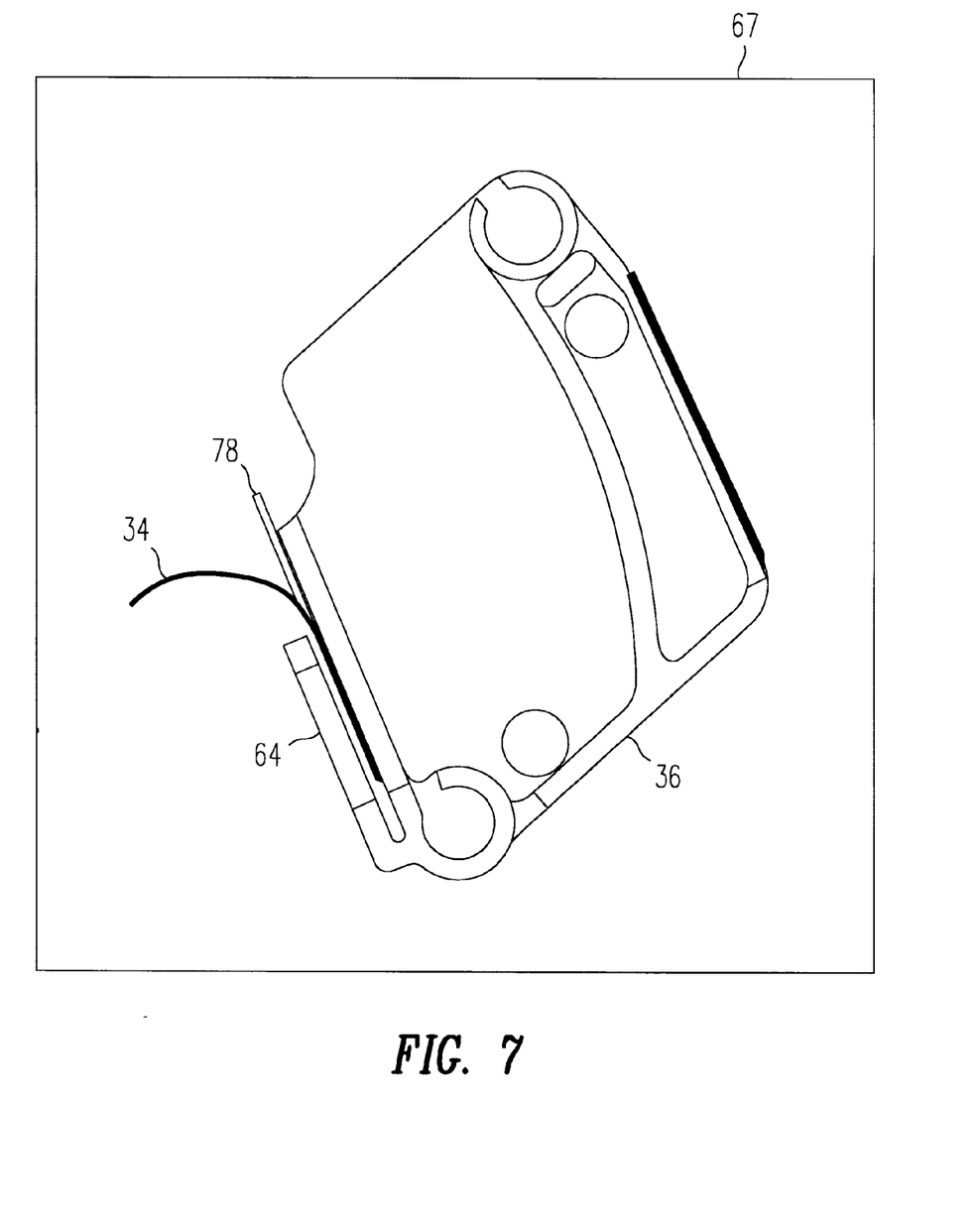
FIG. 7 is a top view of the AE bracket with the actuator flex cable and damper inserted therein.

FIG. 7 shows the damping means 78 located on the opposite end of the flex cable loop at the AE bracket 36 with the actuator flex cable 34 fixed at clip 64. Damping means 78 is inserted at the clip 64 to engage the length of the actuator flex cable 34 in the clip area. Damping means 78 is inserted in the clip area on the side of the actuator flex cable 34 that faces the AE bracket. In this embodiment, damping means 78 can comprise damping materials including foam, elastomers, encapsulated viscoelastics, spring clips or extensions of the AE bracket support.

Figure 8:
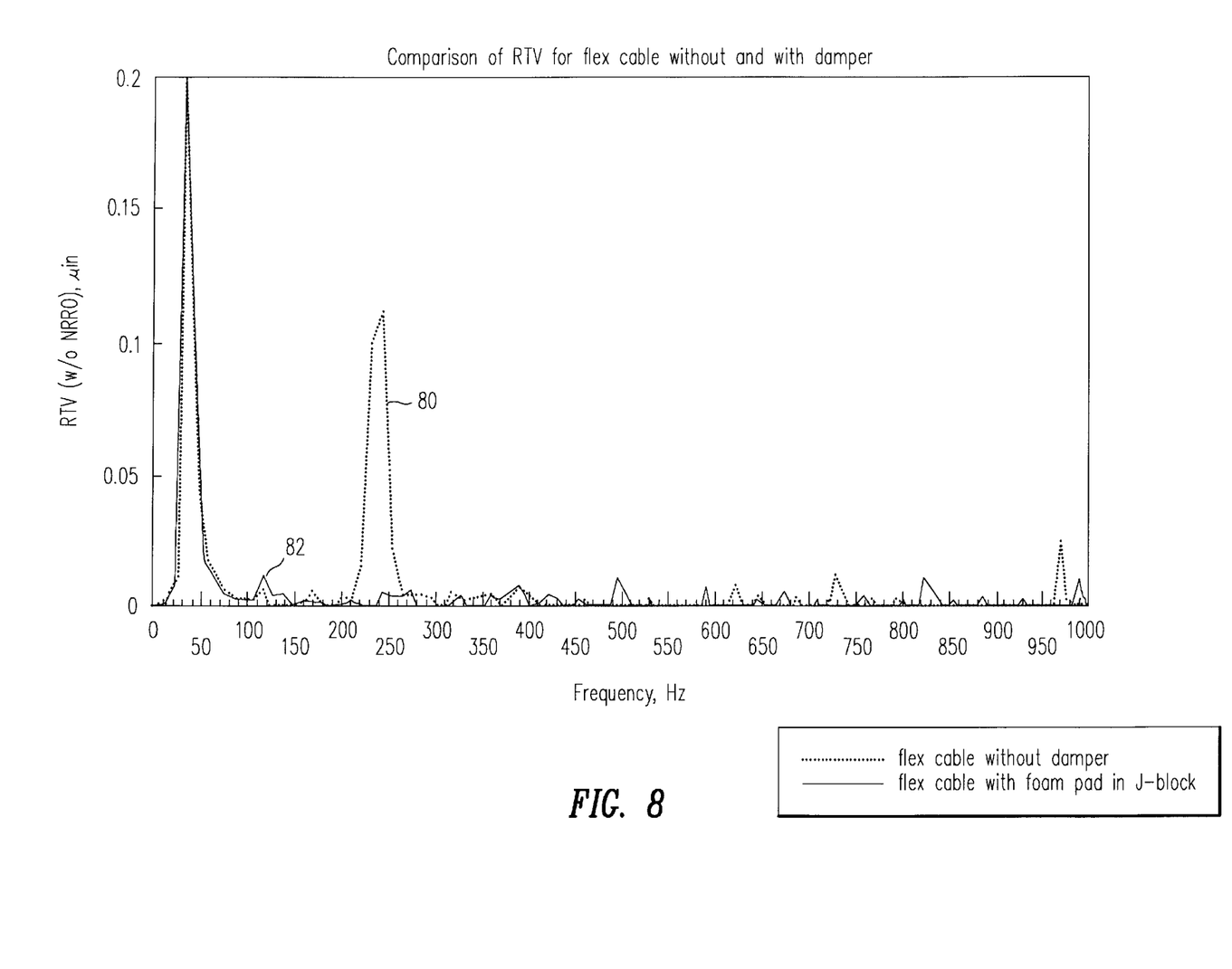
FIG. 8 is a graph showing the random transient vibration (RTV) amplitude of a slider versus frequency before and after damping by the method of this invention.

Referring now to FIG. 8, random transient vibration data as a function of frequency is shown without damping of the actuator flex cable in curve 80 and with damping of the actuator flex cable by the methods of the present invention in curve 82. The peak at 240 Hz on curve 80 without damping of the actuator flex cable vibration modes represents unwanted transducer dynamic displacement at a track on the disk surface. With damping of the actuator flex cable by means of the preferred embodiment of this invention, the 240 Hz peak due to actuator flex cable vibrations has been suppressed (curve 82). Elimination of the random transient vibration due to the actuator flex cable vibration significantly improves disk drive performance during data accessing operations.

While the preferred embodiments of the present invention have been illustrated herein in detail, it should be apparent that modifications and adaptations to those embodiments may occur to those skilled in the art without departing from the scope of the present invention as set forth in the following claims.

What is claimed is:

1. A disk drive system comprising:

a disk with a data surface of concentric data tracks;

a spindle shaft supporting said disk, said spindle shaft for rotating said disk about an axis generally perpendicular to the disk;

a slider maintained in operative relationship with the data surface when the disk is rotating;

a transducer attached to the slider for reading data from and writing data to the data surface;

an actuator for moving the slider generally radially relative to the disk to allow the transducer to access the data tracks, said actuator having an actuator arm;

a suspension for connecting said slider to said actuator arm;

an actuator flex cable connecting an amplifier chip on the actuator arm with an external connection port, the actuator flex cable being connected to the actuator arm by a connector having a curved end extending outward from the actuator arm, said connector further having a first surface attached to the actuator arm and a second surface to which the flex cable is attached; and a damper in the curved end of said connector.

2. The disk drive assembly as claimed in claim 1, wherein the damper is formed of a foam damping material.

3. The disk drive assembly of claim 2, wherein the damper is formed of encapsulated visco-elastic material.

4. The disk drive assembly as claimed in claim 1, wherein the damper is formed of a rubber damping material.

5. The disk drive assembly of claim 1, wherein the damper is adhesively attached to the actuator flex cable.

6. The disk drive assembly of claim 5, wherein the damper is further comprised of a spring clip attached to the actuator flex cable.

7. The disk drive assembly of claim 1, wherein the damper extends beyond the curved end of the connector and is in contact with the actuator flex cable so as to dampen actuator flex cable vibrations.

8. A disk drive system comprising:

a disk with a data surface of concentric data tracks;

a spindle shaft supporting said disk, said spindle shaft for rotating said disk about an axis generally perpendicular to the disk;

a slider maintained in operative relationship with the data surface when the disk is rotating;

a transducer attached to the slider for reading data from and writing data to the data surface;

an actuator for moving the slider generally radially relative to the disk to allow the transducer to access the data tracks, said actuator having an actuator arm;

a suspension for connecting said slider to said actuator arm;

an actuator flex cable connecting an amplifier chip on the actuator arm with an external connection port, the actuator flex cable being connected to the actuator arm by a connector having a curved end extending outward from the actuator arm, said connector further having a first surface attached to the actuator arm and a second surface to which the flex cable is attached; and a damper extending from and integrally formed with the curved end of said connector.

9. A disk drive system comprising:

a disk with a data surface of concentric data tracks;

a spindle shaft supporting said disk, said spindle shaft for rotating said disk about an axis generally perpendicular to the disk;

a slider maintained in operative relationship with the data surface when the disk is rotating;

a transducer attached to the slider for reading data from and writing data to the data surface;

an actuator for moving the slider generally radially relative to the disk to allow the transducer to access the data tracks, said actuator having an actuator arm;

a suspension for connecting said slider to said actuator arm;

an arm electronics bracket;

an actuator flex cable connecting an amplifier chip on the actuator arm with an external connection port, the actuator flex cable being connected to the arm electronics bracket by a curved clip; and a damper in the curved clip on the arm electronics bracket, said damper coupled to the actuator flex cable.

10. The disk drive assembly as claimed in claim 9, wherein the damper is formed of a foam damping material.

11. The disk drive assembly of claim 10, wherein the damper is adhesively attached to the actuator flex cable.

12. The disk drive assembly as claimed in claim 9, wherein the damper is formed of a rubber damping material.

13. The disk drive assembly of claim 12, wherein the damper is adhesively attached to the actuator flex cable.

14. A disk drive system comprising:

a disk with a data surface of concentric data tracks;

a spindle shaft supporting said disk, said spindle shaft for rotating said disk about an axis generally perpendicular to the disk;

a slider maintained in operative relationship with the data surface when the disk is rotating;

a transducer attached to the slider for reading data from and writing data to the data surface;

an actuator for moving the slider generally radially relative to the disk to allow the transducer to access the data tracks, said actuator having an actuator arm;

a suspension for connecting said slider to said actuator arm;

an actuator flex cable connecting an amplifier chip on the actuator arm with an external connection port, the actuator flex cable being connected to the actuator arm by a connector having a curved end extending outward from the actuator arm, said connector further having a first surface attached to the actuator arm and a second surface to which the flex cable is attached wherein the flex cable forms a curved loop extending outward from the actuator arm; and a damper inserted in the curved end of said connector at a point where the actuator flex cable folds to face the actuator.

15. The disk drive system of claim 14, wherein the damper extends along the length of the actuator flex cable in the connector region.

16. In a disk drive system having an actuator assembly for moving a slider relative to a surface of a disk, and an actuator flex cable connected between the actuator and an external connection port, a method for damping actuator flex cable vibrations, comprising the steps of:

aligning the actuator flex cable along a curved connector on the actuator;

aligning the actuator flex cable along a clip on an arm electronics bracket for connection to the external connection port;

forming a loop in the actuator flex cable between the connector and the clip; and inserting a damper in the curved end of the connector.

17. The method as claimed in claim 16, wherein the damper is formed of a foam damping material.

18. The method as claimed in claim 17, wherein the damper is a spring clip.

19. The method as claimed in claim 16, wherein the damper is formed of a rubber damping material.

20. The method as claimed in claim 16, wherein the damper is formed of encapsulated visco-elastic.

21. The method as claimed in claim 16, further comprising the step of attaching a second damper to the clip on the arm electronics bracket so that the second damper is in contact with the actuator flex cable.

22. An actuator assembly for a disk drive comprising:

an actuator for moving a slider generally radially relative to a disk to allow a transducer to access data tracks on the disk, said actuator having an actuator arm;

a suspension for connecting said slider to said actuator arm;

an actuator flex cable, the actuator flex cable being connected to the actuator arm by a connector having a curved end extending outward from the actuator arm, said connector further having a first surface attached to the actuator arm and a second surface to which the flex cable is attached; and a damper in the curved end of said connector.

23. The actuator assembly of claim 22, wherein the damper extends beyond the curved end of the connector and is in contact with the actuator flex cable so as to dampen actuator flex cable vibrations.

* * * * *

UNITED STATES PATENT AND TRADEMARK OFFICE
CERTIFICATE OF CORRECTION

PATENT NO. : 5,907,452  
DATED : May 25, 1999  
INVENTOR(S) : T. Kan

Page 1 of 1

It is certified that error appears in the above-identified patent and that said Letters Patent is hereby corrected as shown below:

Section [56], the following reference was omitted:
   --OTHER PUBLICATIONS
Anonymous, "Flex Cable Dampener", Research Disclosure, May 1989, No. 301115. --

Signed and Sealed this

Twenty-first Day of August, 2001

*Attest:*

NICHOLAS P. GODICI
*Attesting Officer*    *Acting Director of the United States Patent and Trademark Office*